(12) United States Patent
Tsutsumi et al.

(10) Patent No.: US 8,622,719 B2
(45) Date of Patent: Jan. 7, 2014

(54) HYDRAULIC PUMP STRUCTURE FOR WIND TURBINE GENERATOR OR TIDAL CURRENT GENERATOR AND METHOD OF MOUNTING HYDRAULIC PUMP

(75) Inventors: Kazuhisa Tsutsumi, Tokyo (JP);
Noguchi Toshihide, Tokyo (JP);
Yasuhiro Korematsu, Tokyo (JP);
Masayuki Shimizu, Tokyo (JP);
Alasdair Robertson, Midlothian (GB);
Uwe Stein, Midlothian (GB); Hauke Karstens, London (GB)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/997,671

(22) PCT Filed: Nov. 30, 2010

(86) PCT No.: PCT/JP2010/006981
§ 371 (c)(1),
(2), (4) Date: Feb. 15, 2011

(87) PCT Pub. No.: WO2012/073280
PCT Pub. Date: Jun. 7, 2012

(65) Prior Publication Data
US 2012/0063929 A1 Mar. 15, 2012

(51) Int. Cl.
*F04B 17/00* (2006.01)
*F04B 35/00* (2006.01)
*F04B 1/04* (2006.01)
*F03D 9/00* (2006.01)
*H02P 9/04* (2006.01)

(52) U.S. Cl.
USPC ............. 417/330; 417/273; 417/334; 290/44; 290/55

(58) Field of Classification Search
USPC .......... 417/273, 330, 334; 290/43, 44, 54, 55; 60/398
See application file for complete search history.

(56) References Cited

U.S. PATENT DOCUMENTS

| 4,280,061 A | 7/1981 | Lawson-Tancred |
| 4,496,847 A | 1/1985 | Parkins |

(Continued)

FOREIGN PATENT DOCUMENTS

| CN | 101383580 | 3/2009 |
| CN | 101964533 | 2/2011 |

(Continued)

OTHER PUBLICATIONS

Rampen, W.H.S., et al., "Gearless Transmissions for Large Wind-Turbines—The History and Future of Hydraulic Drives", Dewek Bremen, Dec. 2006, pp. 1-9.

(Continued)

*Primary Examiner* — Peter J Bertheaud
(74) *Attorney, Agent, or Firm* — Kanesaka Berner & Partners, LLP

(57) ABSTRACT

A hydraulic pump unit includes a cylindrical member that is fit into an outer circumference of the main shaft and a hydraulic pump body arranged on an outer circumferential side of the cylindrical member. The hydraulic pump body includes a ring cam mounted on the outer circumference of the cylindrical member, a pump bearing, a pump housing, a plurality of pistons housed in the pump housing and actuated by the ring cam, and a plurality of cylinders which guide the plurality of pistons in a radial direction and are arranged in a circumferential direction. The hydraulic pump unit is configured such that the pump unit is insertably fixed to the main shaft by the cylindrical member.

18 Claims, 7 Drawing Sheets

(56) References Cited

U.S. PATENT DOCUMENTS

| | | | |
|---|---|---|---|
| 4,498,017 A * | 2/1985 | Parkins | 290/44 |
| 5,944,493 A | 8/1999 | Albertin et al. | |
| 6,272,970 B1 | 8/2001 | Schaefer | |
| 6,911,743 B2 | 6/2005 | Ishizaki | |
| 7,418,820 B2 * | 9/2008 | Harvey et al. | 60/487 |
| 7,436,086 B2 | 10/2008 | McClintic | |
| 7,569,943 B2 | 8/2009 | Kovach et al. | |
| 7,709,972 B2 | 5/2010 | Arinaga et al. | |
| 8,074,450 B2 * | 12/2011 | Nies et al. | 60/398 |
| 2007/0274848 A1 | 11/2007 | Arbogast et al. | |
| 2008/0206073 A1 | 8/2008 | Caldwell et al. | |
| 2008/0308980 A1 | 12/2008 | Mitsch | |
| 2009/0140522 A1 | 6/2009 | Chapple et al. | |
| 2009/0155095 A1 | 6/2009 | Gollner | |
| 2009/0317266 A1 | 12/2009 | Rampen et al. | |
| 2010/0032959 A1 * | 2/2010 | Nies | 290/55 |
| 2010/0040470 A1 | 2/2010 | Nies | |
| 2010/0047104 A1 | 2/2010 | Inagaki et al. | |
| 2010/0133817 A1 | 6/2010 | Kinzie et al. | |
| 2011/0025059 A1 | 2/2011 | Helle et al. | |
| 2011/0142596 A1 * | 6/2011 | Nies | 415/13 |
| 2011/0204630 A1 | 8/2011 | Arinaga et al. | |

FOREIGN PATENT DOCUMENTS

| | | |
|---|---|---|
| CN | 201747854 | 2/2011 |
| CN | 201982255 | 9/2011 |
| DE | 1653420 | 12/1971 |
| DE | 10345406 | 4/2004 |
| EP | 0020207 | 12/1980 |
| EP | 1134410 | 9/2001 |
| EP | 1566543 | 8/2005 |
| EP | 2003362 | 12/2008 |
| GB | 1003003.9 | 2/2010 |
| GB | 2463647 | 3/2010 |
| GB | 1009013.2 | 5/2010 |
| GB | 1013773.5 | 8/2010 |
| JP | 4-37875 U | 3/1992 |
| JP | 2000-130354 A | 5/2000 |
| JP | 2005248738 | 9/2005 |
| JP | 3822100 | 6/2006 |
| JP | 2007-239599 | 9/2007 |
| KR | 1020070033318 A | 3/2007 |
| KR | 20070043919 A | 4/2007 |
| KR | 20090014394 A | 2/2009 |
| KR | 100947075 | 3/2010 |
| WO | 91/05163 | 4/1991 |
| WO | 03/098037 | 11/2003 |
| WO | 2004/025122 | 3/2004 |
| WO | 2006109079 A1 | 10/2006 |
| WO | 2007/053036 | 5/2007 |
| WO | 2008012587 A2 | 1/2008 |
| WO | 2008/113699 | 9/2008 |
| WO | 2009-058022 | 5/2009 |
| WO | 2009/078072 | 6/2009 |
| WO | 2010/033035 | 3/2010 |
| WO | 2010/085988 | 8/2010 |

OTHER PUBLICATIONS

Salter, S. H., "Proposal for a Large Vertical-Axis Tidal-Stream Generator with Ring-Cam Hydraulics", Department of Mechanical Engineering, Mayfiled Road, University of Edinburgh EH9 3JL, Scotland, Third European Wave Energy Conference, Sep. 30-Oct. 2, 1998, Patras Greece.
Rampen, W. H. S., et al., "Progress on the Development of the Wedding-Cake Digital Hydraulic Pump/Motor", 2nd European Wave Power Conference, Lisbon, Nov. 8-10, 1995.
International Search Report and Written Opinion for PCT/JP2010/006981, mailed May 4, 2012.
Office Action effective Jan. 22, 2013 as issued in corresponding Japanese Application No. 2010-548960—English Language Version.
Office Action effective Jan. 22, 2013 as issued in corresponding Japanese Application No. 2010-548960—Japanese Language Version.
International Preliminary Report on Patentability as mailed on Jun. 13, 2013.
Korean Notice of Grant as issued on Apr. 16, 2013 (Korean Language and English Translation).
Japanese Office Action dated Aug. 19, 2013 as issued in JP2012-5075122, with english translation.
European Search Report for European application No. 13160517, dated May 21, 2013.
Written Opinion for international application No. PCT/JP2011/006695, mailed Feb. 20, 2013.
Written Opinion for international application No. PCT/JP2011/006694, mailed Jun. 20, 2012.
International Search Report for international application No. PCT/JP2011/006694 mailed Jun. 13, 2013.
Written Opinion for international application No. PCT/JP2011/003002, mailed Feb. 22, 2012.
International Search Report for international application No. PCT/JP2011/003002, mailed Dec. 13, 2012.
Decision to Grant a Patent for Japanese application No. 2012-524406, mailed Jul. 2, 2013.
Notice of Allowance for Canadian application No. 2724633, dated Jun. 27, 2013.
International Search Report for international application No. PCT/JP2011/006695, mailed Jun. 13, 2013.

* cited by examiner

HYDRAULIC PUMP STRUCTURE FOR WIND TURBINE GENERATOR OR TIDAL CURRENT GENERATOR AND METHOD OF MOUNTING HYDRAULIC PUMP

RELATED APPLICATIONS

The present application is based on and claims priority from International Application Number PCT/JP2010/006981, filed Nov. 30, 2010, the disclosures of which is hereby incorporated by reference herein in its entirety.

TECHNICAL FIELD

The present invention relates to a hydraulic pump structure, which generate operating oil pressure to a hydraulic motor for generating electric power mounted on a main shaft of a wind turbine generator or a tidal current generator, and a method of mounting the hydraulic pump on the main shaft.

BACKGROUND ART

As a traditional wind turbine generator, there are a structure in which wind power rotates a propeller and a rotation of the propeller is directly sent to a direct-power generator, or sent to a generator via a gearbox having a prescribed speed increasing ratio, or a structure in which the rotation of the propeller is sent to a generator via a fluid type transmission which is a gearbox constituted of a hydraulic pump and a hydraulic motor. Patent Document 1, JP3822100B discloses one example of a fluid type transmission.

Further, more examples of using a fluid type transmission constituted of a hydraulic motor and a hydraulic pump as a gearbox are disclosed in Patent Document 2, US 2010/0032959A and also in Patent Document 3, US 2010/0040470A.

Patent Documents 2 and 3 propose the hydraulic pump mounted on the main shaft of the wind turbine, structured such that a plurality of cylinders are arranged in the radial direction of the main shaft and radially in a circumferential direction and pistons are arranged slidably in the cylinders such as to be moved by a relative rotation speed difference between the rotation of the main shaft and a rotation of a nacelle side.

CITATION LIST

Patent Literature

[PTL 1]
JP3822100B
[PTL 2]
US2010/0032959A
[PTL 3]
US2010/0040470A

SUMMARY OF INVENTION

Technical Problem

Patent Document 2 and Patent Document 3 discloses a ring cam, hydraulic pistons and cylinders that constitute a hydraulic pump. However, neither of the documents proposes specifically how to mount these parts with respect to a main shaft of a wind turbine, or how to perform the mounting process in a simplified manner, or a structure suitable for mounting the unit to the main shaft and so on.

Further, none of Patent Documents discloses a detailed structure of the hydraulic pump such as the arrangement of a pump bearing for supporting the hydraulic pump to the main shaft.

Therefore, it is necessary to make improvements so as to provide a simple structure which performs the mounting process with ease. By this, it is possible to reduce the number of steps of mounting the hydraulic pump with respect to the main shaft, reduce the cost of performing the mounting process.

In view of the issues above, an object of the present invention is to provide a hydraulic pump structure which improves the ease of mounting the hydraulic pump on the main shaft of a wind turbine generator or a tidal current generator, and a method of mounting the hydraulic pump which can be performed in a simplified manner.

Solution to Problem

To achieve the object, a first aspect of the present invention is a hydraulic pump structure for a wind turbine generator or a tidal current generator which comprises a hub equipped with a plurality of blades, a main shaft connected to the hub and a hydraulic pump mounted on the main shaft, the hydraulic pump structure comprising: a hydraulic pump unit in which the hydraulic pump is unitized by a cylindrical member which is fit into an outer circumference of the main shaft and a hydraulic pump body which is arranged on an outer circumferential side of the cylindrical member, wherein the hydraulic pump body comprises: a ring cam which is mounted on the outer circumference of the cylindrical member; a pump bearing; a pump housing which is provided rotatably with respect to the cylindrical member via the pump bearing and is fixed to a body side of the wind turbine generator or the tidal current generator; a plurality of pistons which are housed in the pump housing and is actuated by the ring cam that is rotated with the main shaft; and a plurality of cylinders which guide the plurality of pistons in a radial direction and are arranged in a circumferential direction, and wherein the hydraulic pump unit is configured such that the pump unit is insertably fixed to the main shaft by the cylindrical member.

According to the first aspect of the present invention, the hydraulic pump unit is configured such that the hydraulic pump is unitized by the cylindrical member which is fit onto an outer circumference of the main shaft and the hydraulic pump body, wherein the hydraulic pump body comprises: the ring cam mounted on the outer circumference of the cylindrical member; the pump bearing; the pump housing provided rotatably with respect to the cylindrical member via the pump bearing and fixed to the body side of the wind turbine generator or the tidal current generator; the plurality of pistons housed in the pump housing and actuated by the ring cam that is rotated with the main shaft; and the plurality of cylinders which guide the plurality of pistons in the radial direction and are arranged in the circumferential direction, and wherein the hydraulic pump unit is configured such that the pump unit is insertably fixed to the main shaft by the cylindrical member, and the hydraulic pump unit is constituted of the cylindrical member and the hydraulic pump body which is arranged on an outer circumferential side of the cylindrical member.

Specifically, the hydraulic pump unit is formed including the cylindrical member and the hydraulic pump unit is inserted onto the main shaft via the cylindrical member, thereby improving the ease of mounting the hydraulic pump unit to the main shaft.

Further, the performance of the hydraulic pump can be checked per unit before mounting the hydraulic pump to the main shaft. The performance of the hydraulic pump can be firmly ensured to improve the reliability of the product.

In such a conventional case that the hydraulic pump is mounted on the main shaft while being assembled, the completed hydraulic pump is already mounted on the main shaft as an actual machine, and thus a detailed confirmation test of the hydraulic pump is hard to perform due to restrictions on items that can be tested of the performance test and so on.

Further, it is preferable in the first aspect of the present invention that the main shaft has a stepped portion with a reduced diameter, and a tip section of the cylindrical member of the hydraulic pump unit comes in contact with the stepped portion so as to position the hydraulic pump unit.

As described above, the tip section of the cylindrical member of the hydraulic pump unit comes in contact with the stepped portion of the main shaft so as to position the hydraulic pump unit. As a result, the positioning becomes easier in the steps such as inserting the hydraulic pump unit onto the main shaft and thus, the workability of the mounting process and the precision and stability of positioning the unit are improved.

Further, it is also preferable in the first aspect of the present invention that the cylindrical member is fixed to the main shaft by any one of a shrink disk connection, a flange coupling, a key connection and an involute spline connection.

As described above, the cylindrical member can be fixed to the main shaft by a shrink disk connection, a flange coupling, a key connection or an involute spline connection other than a simple method of inserting and fitting the cylindrical member onto the main shaft. As a result, the fixing of the cylindrical member with respect to the main shaft is further secured.

Furthermore, it is also preferable in the first aspect of the present invention that the cylindrical member has a large diameter section and small diameter sections disposed on both ends of the large diameter section, the ring cam is arranged on an outer circumferential side of the large diameter section, the pump bearing is mounted on stepped portions between the large diameter section and the small diameter sections.

With the above structure of the cylindrical member having a large diameter section and small diameter sections disposed on both ends of the large diameter section, the pump bearings supporting pump housing on the cylindrical member are respectively mounted on stepped portions between the large diameter section and the small diameter sections. As a result, the positioning of the pump bearing is made easy and it becomes more stable at the mounting position.

Moreover, it is preferable in the first aspect of the present invention that the pump housing is formed into an almost cylindrical shape having end walls and the end walls of the pump housing have an inner circumferential opening which is supported by the pump bearing.

As described above, the pump bearings are respectively mounted on the stepped portions between the large diameter section and the small diameter sections and the pump bearing supports the inner circumferential part of the pump housing on both ends wall thereof. As a result, both end surfaces of the pump housing are guided along the walls forming the stepped portions so as to position the pump housing around the main shaft in a stable manner.

It is also preferable in the first aspect of the present invention that the main shaft has a hollow structure.

Next, a second aspect of the present invention is a method of mounting the hydraulic pump of the wind turbine having the hydraulic pump structure for a wind turbine of the first aspect and the method comprises the steps of: assembling the hydraulic pump unit in advance; then inserting and fixing to the main shaft a first main shaft bearing which secures the main shaft rotatably on a body side of the wind turbine generator or the tidal current generator; then fitting the hydraulic pump unit having been assembled beforehand onto the main shaft via the cylindrical member of the hydraulic pump unit; and then fixing the hydraulic pump unit to the main shaft by means of a fixing member.

According to the second aspect of the present invention, the hydraulic pump unit is assembled in advance in the preliminary step. As already explained in the hydraulic pump structure, the hydraulic pump unit is constituted of the cylindrical member and the hydraulic pump body which is arranged on an outer circumferential side of the cylindrical member. The hydraulic pump body comprises the ring cam, the pump bearing, the pump housing provided rotatably with respect to the cylindrical member via the pump bearing and fixed to the body side of the wind turbine generator or the tidal current generator, the piston housed in the pump housing and actuated by the ring cam that is rotated with the main shaft, and the plurality of cylinders which guide the piston in the radial direction and are arranged in the circumferential direction.

First, the main shaft bearing which secures the main shaft rotatably on a body side of the wind turbine generator or the tidal current generator is inserted and fixed to the main shaft, then the hydraulic pump unit having been assembled beforehand is fit onto the main shaft via the cylindrical member of the hydraulic pump unit; and then the hydraulic pump unit is fixed to the main shaft by means of a fixing member.

As described above, the hydraulic pump is assembled in advance and then inserted and fixed to the main shaft. The performance of the hydraulic pump can be checked per unit before mounting the hydraulic pump to the main shaft. The performance of the hydraulic pump can be firmly ensured to improve the reliability of the product.

Further, compared to the case wherein the hydraulic pump is mounted on the main shaft while being assembled, the hydraulic pump is already assembled before being mounted on the main shaft and the hydraulic pump unit can be assembled in a different place and then fixed to the main shaft. As a result, the restrictions on assembling facilities or test facilities are removed and the assembling of the hydraulic pump unit can be performed efficiently.

Furthermore, in the second aspect of the present invention, the mounting method may further comprise the step of: inserting and fixing a second main shaft bearing, wherein the first main shaft bearing is inserted and fixed, the hydraulic pump unit is then inserted and fixed, and the second main shaft bearing is then inserted and fixed.

By inserting the first main shaft bearing and the second main shaft bearing respectively before and after inserting the hydraulic pump unit, the main shaft bearings can be fixed on the front and rear side of the hydraulic pump unit and the mounting position can be changed depending on the locations of the main shaft bearings.

Further, it is preferable in the second aspect of the present invention that the hydraulic pump unit and the first main shaft bearing are inserted and fixed from a side opposite to the hub.

The hydraulic pump unit and the first main shaft bearing are inserted and fixed from a side opposite to the hub. Specifically, the main shaft is placed up right with the hub side on the bottom, and the hydraulic pump unit and the first main shaft bearing are inserted from above. As a result, the inserting of the hydraulic pump unit can be performed in a stable manner.

Furthermore, the mounting method of the second aspect may further comprise the step of: fixing the main shaft to a nacelle on the body side of the wind turbine generator or the tidal current generator in a state where the first main shaft bearing and the hydraulic pump unit are fixed to the main shaft, after the steps of inserting and fixing the first main shaft bearing and the hydraulic pump unit to the main shaft.

In this manner, the hydraulic pump unit and the main shaft bearing are fixed with respect to the main shaft, and then the main shaft is fixed to the nacelle on the body side of the wind turbine generator or the tidal current generator. As a result, the process of mounting the hydraulic pump on the nacelle is made easy and also the positioning of the hydraulic pump unit with respect to the main shaft is performed in a more stable manner, thereby securely achieving the performance of the hydraulic pump.

It is also preferable in the second aspect of the present invention that in the step of fixing the main shaft to the nacelle on the body side of the wind turbine generator or the tidal current generator, the pump housing of the hydraulic pump unit is fixed to the nacelle on the body side of the wind turbine generator or the tidal current generator via a damper mechanism. Preferably the damper mechanism has a damping effect against vibration and prevents deformation of the pump housing and an assembling difference while maintaining an axial center of the pump housing of the hydraulic pump unit with respect to the nacelle, and the damper mechanism is mounted on a flange portion protruding in a radial direction from both side of a torque arm arranged on an outer circumference of the pump housing.

As described above, the pump housing is fixed to the nacelle via the damper mechanism. As a result, the deformation of the housing and the assembling difference can be prevented and also there is a damping effect against the vibration from the hydraulic pump side.

Next, a third aspect of the present invention is a method of mounting the hydraulic pump of the wind turbine generator or the tidal current generator having the hydraulic pump structure for a wind turbine of the first aspect. The method comprises the steps of: assembling the hydraulic pump unit in advance; then inserting and fixing to the main shaft a third main shaft bearing which secures the main shaft rotatably on a body side of the wind turbine generator or the tidal current generator; then inserting and fixing a fourth main shaft bearing to the main shaft adjacent to the third main shaft bearing or with a distance from the third main shaft bearing; then fitting the hydraulic pump unit having been assembled beforehand on the main shaft via the cylindrical member of the hydraulic pump unit; and then fixing the hydraulic pump unit to the main shaft by means of a fixing member.

According to the third aspect of the present invention, prior to inserting the hydraulic pump unit onto the main shaft, the third and fourth main shaft bearings are inserted and fixed to the main shaft. The step of inserting and fixing the main shaft bearings is performed before the step of inserting the large hydraulic pump unit. Thus, the fixing the hydraulic pump unit to the main shaft can be securely performed.

Further, the hydraulic pump unit can be fixed free of restrictions from both of the main shaft bearings and the ease of mounting the hydraulic pump on the main shaft is improved. The rest of the operation effects is the same as the second aspect of the present invention.

It is also preferable in the third aspect of the present invention that the hydraulic pump unit and the third and fourth main shaft bearings are inserted and fixed from a side opposite to the hub.

The hydraulic pump unit and the first main shaft bearing are inserted and fixed from a side opposite to the hub. Specifically, the main shaft is placed up right with the hub side on the bottom, and the hydraulic pump unit and the first main shaft bearing are inserted from above. As a result, the inserting of the hydraulic pump unit can be performed in a stable manner.

The mounting method of the third aspect of the present invention may further comprise the step of: fixing the main shaft to a nacelle on the body side of the wind turbine generator or the tidal current generator in a state where the third and fourth main shaft bearings and the hydraulic pump unit are fixed to the main shaft, after the steps of inserting and fixing the third and fourth main shaft bearings and the hydraulic pump unit to the main shaft.

In this manner, the hydraulic pump unit and the main shaft bearing are fixed with respect to the main shaft, and then the main shaft is fixed to the nacelle on the body side of the wind turbine generator or the tidal current generator. As a result, the process of mounting the hydraulic pump on the nacelle is made easy and also the positioning of the hydraulic pump unit with respect to the main shaft is performed in a more stable manner, thereby firmly achieving the performance of the hydraulic pump.

Further, it is preferable in the third aspect of the present invention that in the step of fixing the main shaft to the nacelle on the body side of the wind turbine generator or the tidal current generator, the pump housing of the hydraulic pump unit is fixed to the nacelle on the body side of the wind turbine generator or the tidal current generator side via a damper mechanism. Preferably the damper mechanism has a damping effect against vibration and prevents deformation of the pump housing and an assembling difference while maintaining an axial center of the pump housing of the hydraulic pump unit with respect to the nacelle, and the damper mechanism is mounted on a flange portion protruding in a radial direction from both side of a torque arm arranged on an outer circumference of the pump housing.

As described above, the pump housing is fixed to the nacelle via the damper mechanism. As a result, the deformation of the housing and the assembling difference can be prevented and also there is a damping effect against the vibration from the hydraulic pump side.

Advantageous Effects of Invention

According to the first aspect of the present invention, the hydraulic pump unit is configured such that the hydraulic pump is unitized by the cylindrical member which is fit into an outer circumference of the main shaft and the hydraulic pump body, wherein the hydraulic pump body comprises: the ring cam mounted on the outer circumference of the cylindrical member; the pump bearing; the pump housing provided rotatably with respect to the cylindrical member via the pump bearing and fixed to the body side of the wind turbine generator or the tidal current generator; the piston housed in the pump housing and actuated by the ring cam that is rotated with the main shaft; and the plurality of cylinders which guide the piston in the radial direction and are arranged in the circumferential direction, and wherein the hydraulic pump unit is configured such that the pump unit is insertably fixed to the main shaft by the cylindrical member, and the hydraulic pump unit is constituted of the cylindrical member and the hydraulic pump body which is arranged on an outer circumferential side of the cylindrical member. As a result, the hydraulic pump unit can be inserted onto the main shaft via the cylindrical member and the ease of mounting the hydraulic pump unit to the main shaft is improved.

Further, the performance of the hydraulic pump can be checked per unit before mounting the hydraulic pump to the main shaft. The performance of the hydraulic pump can be firmly ensured to improve the reliability of the product.

Further, according to the second aspect of the present invention, the mounting method comprises the steps of assembling the hydraulic pump unit in advance; then inserting and fixing to the main shaft a first main shaft bearing which secures the main shaft rotatably on a body side of the wind turbine generator or the tidal current generator; then fitting the hydraulic pump unit having been assembled beforehand onto the main shaft via the cylindrical member of the hydraulic pump unit; and then fixing the hydraulic pump unit to the main shaft by means of a fixing member. By this, the performance of the hydraulic pump can be checked per unit before mounting the hydraulic pump to the main shaft. The performance of the hydraulic pump can be firmly ensured to improve the reliability of the product.

Further, compared to the case wherein the hydraulic pump is mounted on the main shaft while being assembled, the hydraulic pump is already assembled before being mounted on the main shaft and the hydraulic pump unit can be assembled in a different place and then fixed to the main shaft. As a result, the restrictions on assembling facilities or test facilities are removed and the assembling and inspections of the hydraulic pump unit can be performed efficiently.

According to the third aspect of the present invention, prior to inserting the hydraulic pump unit onto the main shaft, the third and fourth main shaft bearings are inserted and fixed to the main shaft. The step of inserting and fixing the main shaft bearings is performed before the step of inserting the large hydraulic pump unit. Thus, the fixing the hydraulic pump unit to the main shaft can be performed in a stable manner.

Further, the hydraulic pump unit can be fixed free of restrictions from both of the main shaft bearings and the ease of mounting the hydraulic pump on the main shaft is improved.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

First Preferred Embodiment (General Structure)

Figure 1:
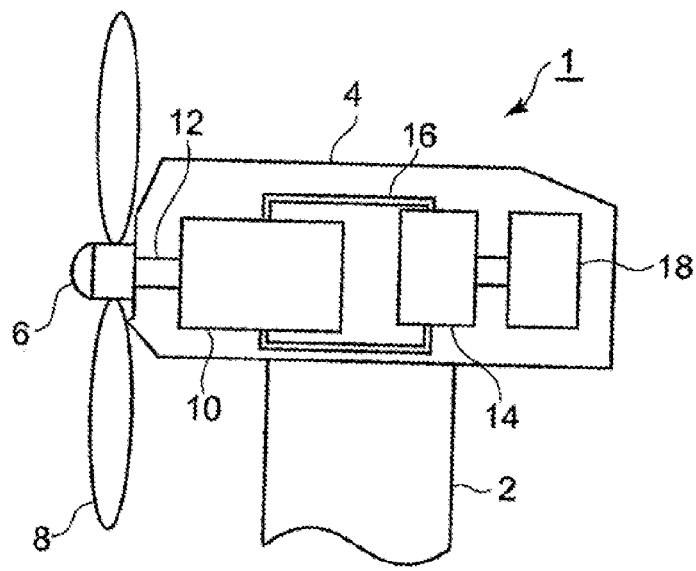
FIG. 1 is an overall view of a general structure of a wind turbine of the present invention.

First, a general structure of a wind turbine generator using a hydraulic pump is explained reference to FIG. 1.

The wind turbine generator 1 is mainly constituted of a tower 2 installed upright on a base, a nacelle 4 installed on top of the tower 2, a rotor hub (hub) 6 mounted on the nacelle 4, a plurality of blades 8 mounted on the hub 6 and a main shaft 12 interconnected with the hub 6 and transmitting a rotation force to a hydraulic pump (hydraulic pump unit) 10 described later.

Further, the nacelle 4 houses a hydraulic pipe 16 which leads a hydraulic pressure generated by a hydraulic pump 10 to a hydraulic motor 14 arranged on a downstream side, and a generator 18 to which the rotation force generated by the hydraulic motor 14 is transmitted.

Figure 2:
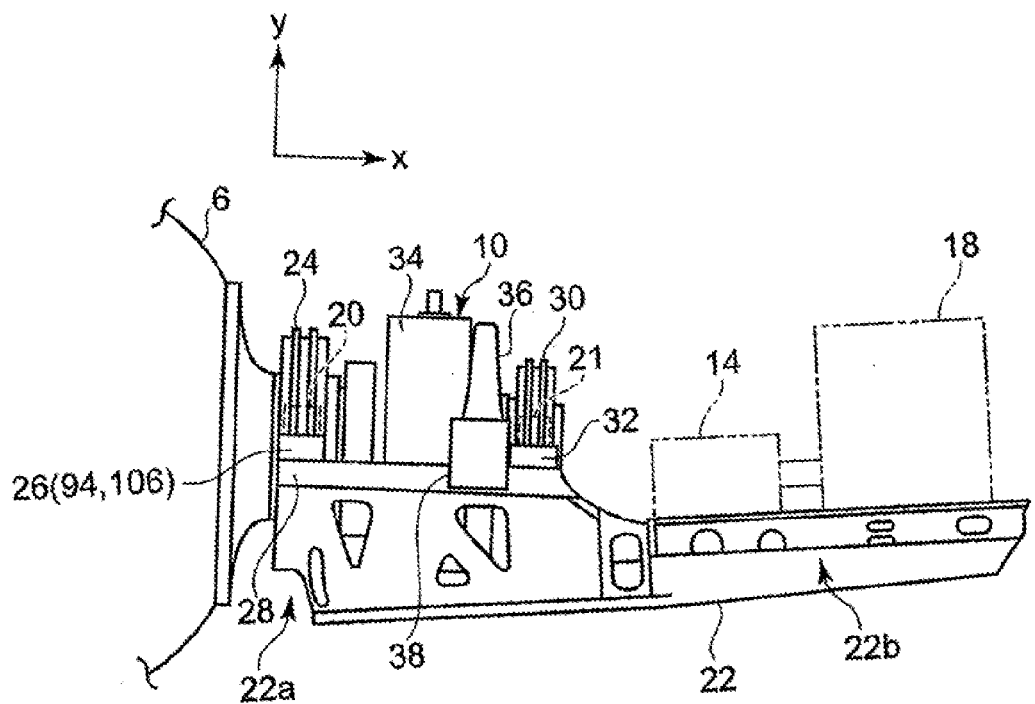
FIG. 2 is an overall view of a hydraulic pump in a first preferred embodiment of the present invention

FIG. 2 shows the configurations of the hydraulic pump 10 in the nacelle 4, main shaft bearings 20 and 21, and a frame 22 of the nacelle 4. As illustrated in the drawing, the first main shaft bearing 20 and the second main shaft bearing 22 are arranged on a front side and a rear side of the hydraulic pump respectively. The frame 22 consists of a first frame part 22a which supports and fixes the hydraulic pump 10 and a second frame part 22b which supports and fixes the hydraulic motor 14 and the generator 18. The hydraulic pump 10, the first main shaft bearing 20 and the second main shaft bearing 21 are arranged in the first frame part 22a.

Further, the first frame part 22a slants upward with respect to a horizontal surface along the axial direction of the main shaft 12.

The first main shaft bearing 20 is surrounded by a first main shaft bearing cover 24 and secured onto a supporting rail 28 by a flange member 26 provided on both sides in the radial direction. The supporting rail 28 is formed along the direction of the main shaft on both sides in the width direction perpendicular to the longitudinal direction of the first frame part 22a. The second main shaft bearing 21 is secured onto the supporting rail 28 by a flange member 32 on both sides in the radial direction in the manner similar to the first main shaft bearing 21. The first main shaft bearing 20 and the second main shaft bearing 21 are designed to take radial as well as axial loads from both the weight and the thrust applied by the wind to the main shaft 12.

The hydraulic pump 10 is housed in a pump housing 34 formed into an almost cylindrical shape. A torque arm 36 is two part member constituted of a top half circle part and a bottom half circle part disposed around the an outer circumference of the pump housing 34 by joining the top half circle part and the bottom half circle part thereof. A damper mechanism 38 is provided at a joint where the top and bottom half circle parts are joined so as to secure the torque arm 36 onto the supporting rail 28. In this manner, the hydraulic pump 10, the first main shaft bearing 20 and the second main shaft bearing 21 are respectively secured to the first frame part 22a of the frame 22 of the nacelle 4.

Figure 3:
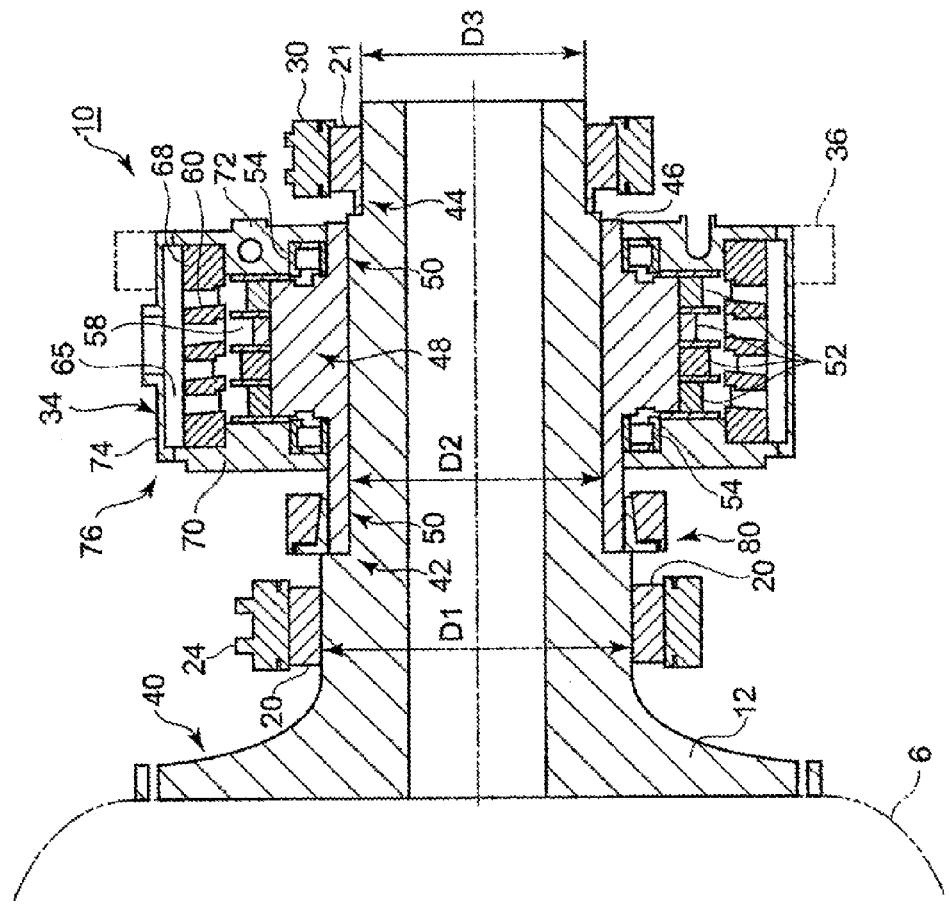
FIG. 3 is a sectional view of the hydraulic pump and the main shaft taken alone the plane X-Y of FIG. 2.
Figure 4:
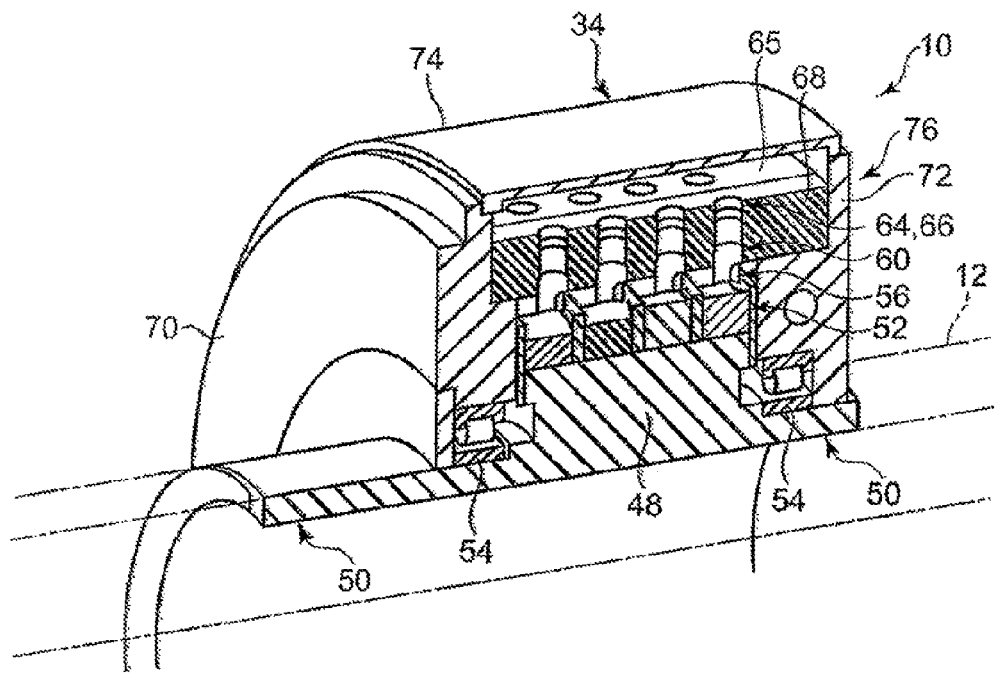
FIG. 4 is a perspective view of a cross-section of the hydraulic pump.

Next, FIG. 2 shows X direction which is an axial center line of the main shaft 12 and Y direction which is perpendicular to X direction. FIG. 3 shows a sectional view of main parts taken along the plane X-Y of FIG. 2. Further, a partial enlarged view of the hydraulic pump 10 of FIG. 3 and components thereof are showed in FIG. 4 through FIG. 7.

In FIG. 3, the main shaft 12 with a hollow structure forms, from a hub side, a hub mount section 40, a first stepped portion 42 with a reduced diameter and a second stepped portion 44 with a reduced diameter and the diameter of the main shaft 12 is reduced in the order of a first diameter D1, a second diameter D2 and a third diameter D3 in this order in a step pattern.

The hydraulic pump 10 is mounted at a location having the second diameter D2. A cylindrical member 46 is fit into an outer circumference of the second diameter D2. The cylindrical member 46 comprises a large diameter section 48 and small diameter sections 50, 50 disposed on both ends of the large diameter section 48. A ring cam 52 is mounted on the outer circumference of the large diameter section 48 and pump bearings 54, 54 are mounted on stepped portions between the large diameter section 48 and the small diameter sections 50.

(Hydraulic Pump Structure)

Figure 5:
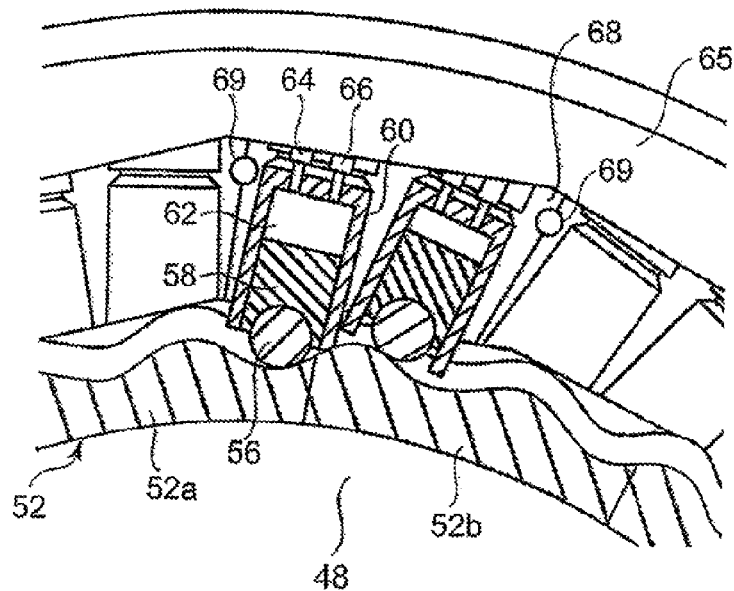
FIG. 5 is a sectional view of a main part of the hydraulic pump in the direction perpendicular to the axis thereof.
Figure 6:
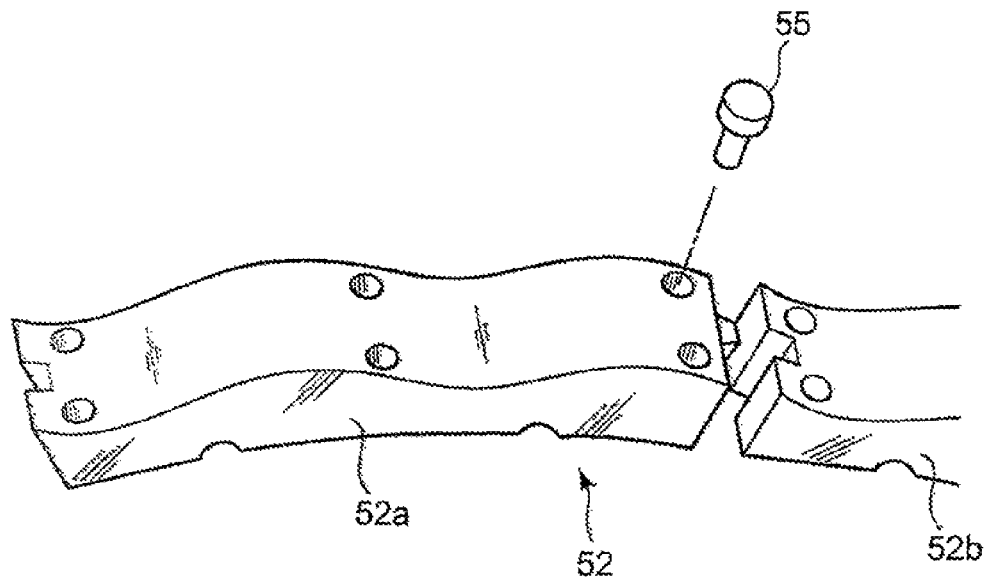
FIG. 6 is an illustrative drawing showing a shape of a ring cam which is a component of the hydraulic pump.

A detailed structure of the hydraulic pump 10 (hydraulic pump unit) is explained in reference to FIG. 3 through FIG. 7. The ring cam 52 is fixed to the outer circumference of the large diameter section of the cylindrical part 46. As shown in FIG. 6, the ring cam 52 is formed by mounting a plurality of cam pieces 52a, 52b, etc. on the outer circumferential side of the large diameter section 48 of the cylindrical part 47 in the circumferential direction thereof by means of pins 55 or bolts (not shown). A plurality of the ring cams 52 may be arranged in the axial direction. The preferred embodiment shows an exemplary case wherein four ring cams 52 are arranged on the large diameter section of the cylindrical part 47. But the number of ring cams can be adequately changed depending on the capacity of the hydraulic pump.

Further, the ring cam 52 may have a cam surface defining a plurality of waves but not limited thereto. The ring cam 52 may be an eccentric cam that has a uniform cam surface and is disposed eccentrically with respect to a shaft center of the main shaft 12.

Figure 7:
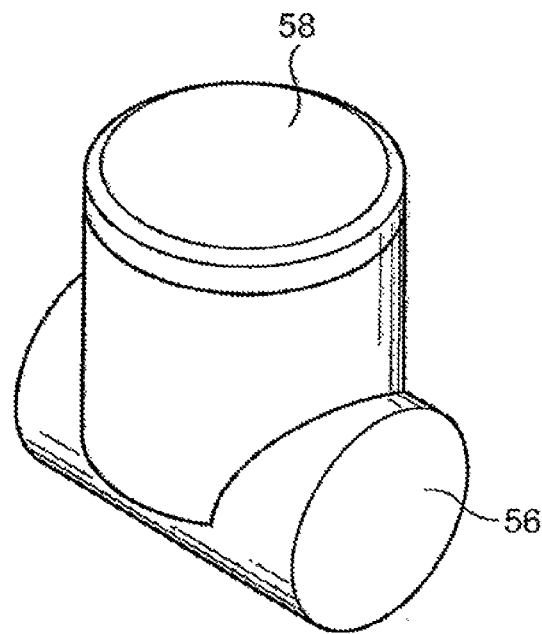
FIG. 7 is an illustrative drawing showing a shape of a roller and piston which are components of the hydraulic pump.

The piston 58 supports a roller 56 arranged on the bottom thereof as shown in FIG. 7. The roller 56 comes in contact with the cam surface of the ring cam 52. The piston 58 moves slidingly in the cylinder 60 to guide the roller along the cam surface. Further, the cylinders 60 are arranged in the radial direction with respect to the shaft center of the main shaft 12 and radially arranged in the circumferential direction.

As illustrated in FIG. 5, the rollers 56 come in contact with the cam surface formed on the outer circumference of the ring cam 52. In conjunction with the rotation of the main shaft 12, the pistons move inward and outward along the cam surface of the ring cam 52. During this process, the operating oil is repeatedly introduced to or discharged from a pressure chamber inside each of the cylinders 60.

A low pressure control valve 64 is arranged in an intake line to the pressure chamber 62 to allow the inflow of oil to the pressure chamber 62. Each low pressure control valve 64 is controlled to determine whether each corresponding pressure chamber operates as a pump or not (the low pressure control valve 64 is closed at the point of maximum volume to function as a pump and left open to disable the function as the pump), and thus the outflow volume of the oil is controlled. Further, a high pressure control valve 66 is arranged in a discharge line to permit discharge of the oil to the high pressure line 16.

The above discharge control of the pressure chamber 62 in the cylinder 60 is performed respectively for each of the plurality of cylinders arranged in the circumferential direction. The rest of the ring cams 52, the rollers 56 and the pistons for each of the remaining ring cams and the cylinders 60 are arranged so as to operate in the same manner as the above. A controller (not shown) is arranged to control the state of each of the cylinders 60 for each array between a working state or disabled state so as to control a pressure and an amount of the discharge oil to be supplied from the cylinders 60 to the hydraulic motor 14.

Each of the cylinders 60, 60, 60, 60 are supported in the pump housing 34 by a cylinder supporting member 68. The cylinder supporting member 68 has an intake line and a discharge line formed therein to communicate with the pressure chamber 62 of each of the cylinders 60 and houses the low pressure control valves 64 and the high pressure control valves 66. Further, each of the cylinders 60 may be directly formed in the cylinder supporting member 68. Specifically, the cylinder supporting member 68 may be configured such that the cylinders are formed therein.

Furthermore, the low pressure control valve 64 is configured such that the operating oil is supplied from a low pressure oil line 65 formed outside of the cylinder supporting member 68 to the low pressure control valve 64, and the high pressure control valve 69 is configured such that the operating oil having been compressed in the pressure chamber 62 is discharged from the high pressure control valve to the hydraulic motor 14 side via a high pressure oil line 69.

The pump housing 34 is constituted of a front side wall 70, a rear side wall 72 and a outer circumferential wall 74 and formed into a cylindrical shape having a top and a bottom. To the rear side wall 72, hydraulic pipes and so on are connected so that the pipes communicate with each line formed in the cylinder supporting member 68.

The front side wall 70 and the rear side wall 72 are respectively supported at inner circumference parts thereof by the pump bearings 54, 54 mounted on the stepped portions between the large diameter section 48 and the small diameter sections 50 of the cylindrical member 46. And thus, the pump housing 34 is rotatably mounted on the cylindrical member 46. Further, the pump housing 34 is fixed to the frame 22 of the nacelle 4 via the torque arm 36 which is disposed on an outer side of the pump housing 34. For example, the torque arm 36 couples to the rear side wall 72. In other embodiments the torque arm 36 might couple to the front side wall 70.

As described above, the pump bearings 54, 54 are respectively mounted on the stepped portions between the large diameter section 38 and the small diameter sections. Thus, the positioning of the pump bearings 54, 54 is easier and the mounting position of the pump bearings 54, 54 is stabilized.

Further, the front side wall 70 and the rear side wall 72 of the pump housing 34 are respectively guided and arranged against the stepped portions between the large diameter section 48 and the small diameter sections 50. Specifically, the front side wall 70 and the rear side wall 72 of the pump housing 34 slidingly contact the surfaces of the stepped portions between the large diameter section 48 and the small diameter sections 50 to be arranged there and thus, the pump housing 34 can be firmly arranged around the main shaft 12.

As described above, the pump housing 34 is secured to the first frame part 22a of the nacelle 4 via the torque arm 36 and the damper mechanism 38. Thus, the rotation of the main shaft 12 generates the relative difference of the rotation speed between the pump housing 34 and the cylindrical member 46. The hydraulic pump mechanism operated by the relative difference of the rotation, is formed in the pump housing 34.

A hydraulic pump body 76 is arranged on the outer circumferential side of the cylindrical member. The hydraulic pump body 76 is constituted of the ring cams 52 mounted on the outer circumference of the cylindrical member 46, the pump bearings 54, the pump housing 34 supported rotatably with respect to the cylindrical part 46 via the pump bearings 54 and fixed to the nacelle 4 side, the pistons 58 housed in the pump housing 34 and actuated by the ring cam 52 rotated by the rotation of the main shaft 12, the plurality of cylinders 60 guiding the pistons 58 in the radial direction and arranged in the circumferential direction and the cylinder supporting member 68 supporting the cylinders 60 and having the oil lines formed therein. The hydraulic pump is the hydraulic pump unit 10 constituted of the cylindrical member 46 and the hydraulic pump body 76 on the outer circumference of the cylindrical member 46.

Further, a tip section of the tip of the cylindrical member 46 comes in contact with the stepped portion 42 so as to position the cylindrical member 46. The cylindrical member 46 is fixed to the main shaft 12 by a shrink disk connection 80.

Furthermore, the cylindrical member 46 may be fixed to the main shaft 12 by a flange coupling, a key connection, an involute spline connection or the like. With this connection structure, the cylindrical member 46 can be not only press fit with respect to the main shaft 12 but also securely fixed to the main shaft 12.

(Mounting Process)

Figure 8:
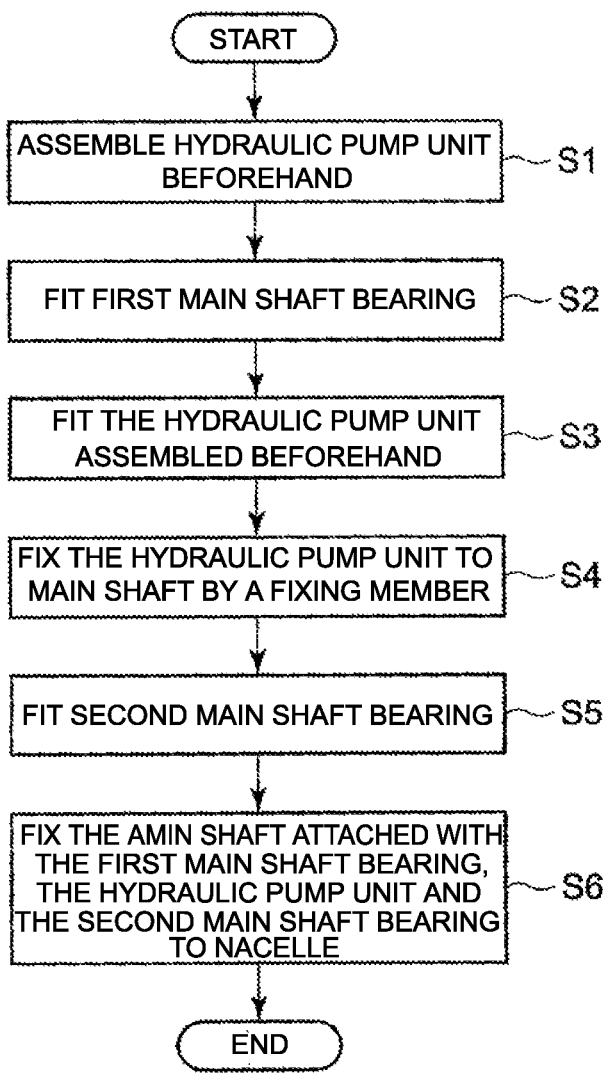
FIG. 8 is a flow chart showing a process of mounting the hydraulic pump in a first preferred embodiment.

In the above structure of the hydraulic pump unit 10, the main shaft 12, the first main shaft bearing 20 and the second main shaft bearing 21, a method of mounting the hydraulic pump unit 10, the first main shaft bearing 20 and the second main shaft bearing 21 on the main shaft 12 is explained in reference to the flow chart of FIG. 8.

First, in a step S1 the hydraulic pump unit 10 is assembled in advance in a preliminary step. The hydraulic pump unit 10 here refers to a completed hydraulic pump 10 which is already assembled by fitting therein the hydraulic pump body 76 which is to be arranged on the outer circumferential side of the cylindrical member 46 as described above. The hydraulic pump should be assembled before being mounted on the main shaft 12.

Next, in a step S2 the first main shaft bearing 20 which rotatably secures the main shaft to the first frame part 22a of the nacelle 4, is insertably fixed to the main shaft 12. Specifically, the main shaft 12 is placed upright and the first main shaft bearing 20 is pressed from above onto a section having the first diameter D1 of the main shaft 12.

In a step S3, the hydraulic pump unit already assembled in the step S1, is pressed onto the main shaft 12 from above so that the inner circumferential part of the cylindrical member 46 is fit to a section having the second diameter D2 of the main shaft 12. Meanwhile, the tip section of the cylindrical part 46 contacts a first stepped portion 42 to be positioned there, thereby making the mounting position precise and stable.

In a step S4 the hydraulic pump is unitized with respect to the main shaft 12 by fixing the hydraulic pump unit 10 to the main shaft 12 by means of a fixing member. The fixing member may be the shrink disk connection 80 described above so as to secure the cylindrical member 46 to the main shaft 12. By this, the fixing of the cylindrical member 46 to the main shaft 12 is further enhanced.

In a step S5 the second main shaft bearing 21 is insertably fixed to the main shaft 12. During the step, front end portion of the second main shaft bearing 21 comes in contact with the second stepped portion 44 and positioned. Thus, the mounting position becomes more precise and stable.

Then, in a step S6 the main shaft 12 is fixed to the nacelle 4 in such a state that the first main shaft bearing 20, the second main shaft bearing 21 and the hydraulic pump unit 10 are mounted on the main shaft 12.

In the step of fixing the main shaft 12 to the nacelle 4 on the body side of the wind turbine generator or the tidal current generator, the pump housing 34 of the hydraulic pump unit 10 is fixed to the nacelle 4 on the body side of the wind turbine generator or the tidal current generator via a damper mechanism 38 which has a damping effect against vibration and prevents deformation of the pump housing 34 and an assembling difference while maintaining an axial center of the pump housing 34 of the hydraulic pump unit 10 with respect to the nacelle 4, and the damper mechanism 38 is mounted on a flange portion 26 protruding in a radial direction from both side of the torque arm 36 arranged on an outer circumference of the pump housing 34.

Therefore, the pump housing 34 is fixed to the nacelle via the damper mechanism 38 and thus, the deformation and the assembling difference can be prevented while mounting the pump housing 34 to the nacelle 4 and further a damping effect is exerted against the vibration from the hydraulic pump side.

In this manner, the hydraulic pump unit 10 is formed by unitizing the hydraulic pump including the cylindrical member 46 and the hydraulic pump unit 10 is insertable onto the main shaft 12 via the cylindrical member 46, thereby improving the ease of mounting the hydraulic pump unit 10 to the main shaft 12.

Further, the performance of the hydraulic pump can be checked per unit before mounting the hydraulic pump to the main shaft 12. The performance of the hydraulic pump can be firmly ensured to improve the reliability of the product.

In such a conventional case that the hydraulic pump is mounted on the main shaft while being assembled, the completed hydraulic pump is already mounted on the main shaft as an actual machine, and thus a detailed confirmation test of the hydraulic pump is hard to perform due to the limited extent of the performance test, limited test facilities and the like.

Moreover, in this case wherein the hydraulic pump 10 is already assembled before being mounted on the main shaft, the hydraulic pump unit can be assembled in a different place and then fixed to the main shaft 12. As a result, the restrictions on assembling facilities or test facilities are removed and the assembling of the hydraulic pump unit can be performed efficiently.

Second Preferred Embodiment

Figure 9:
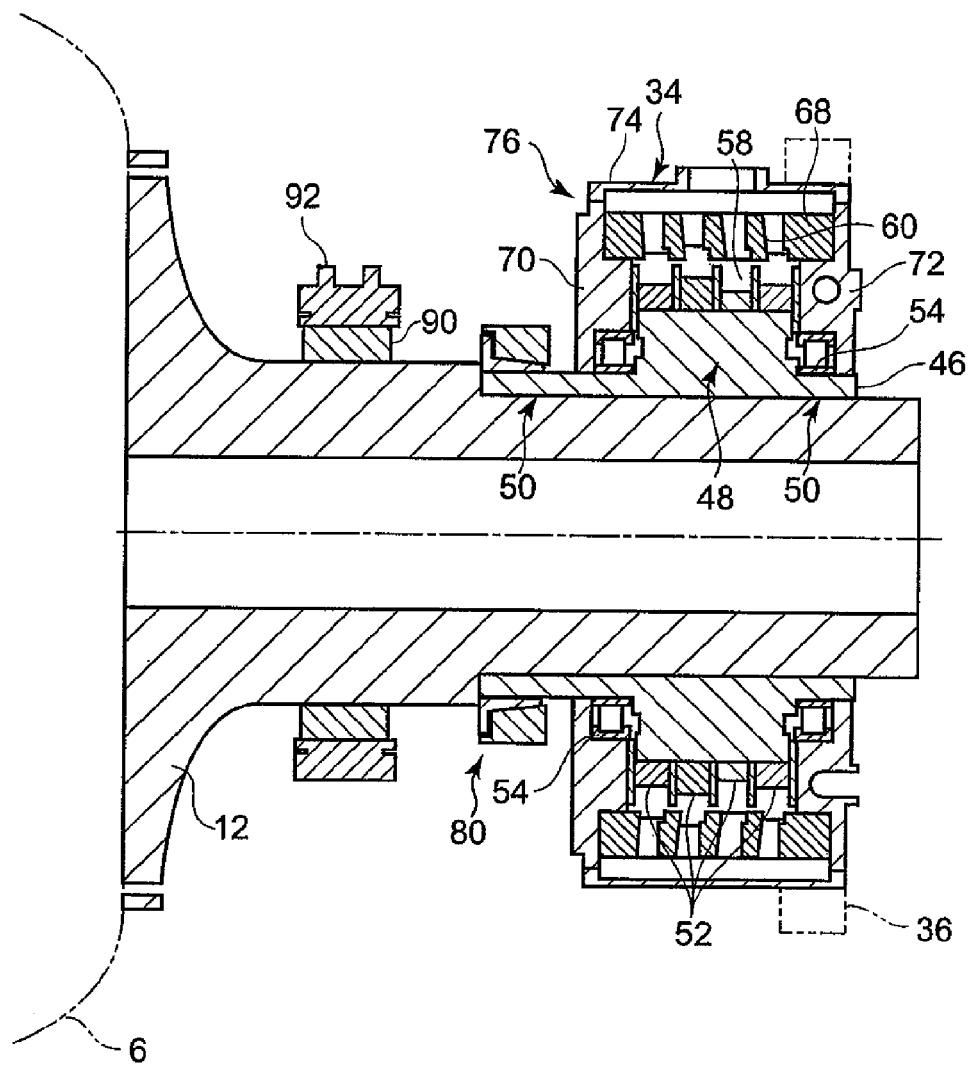
FIG. 9 is an overall view of a general structure of a hydraulic pump in a second preferred embodiment of the present invention.
Figure 10:
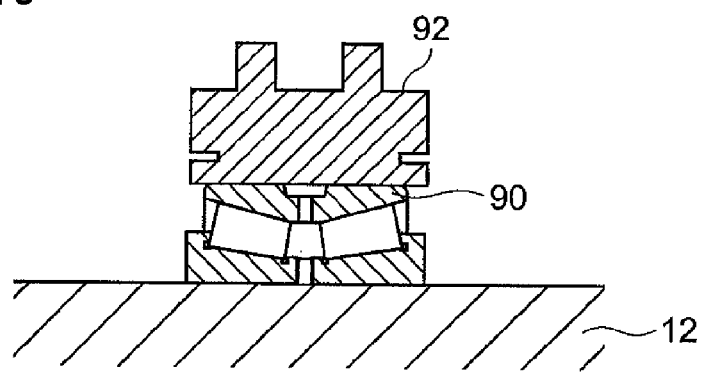
FIG. 10 is an illustrative drawing of a main shaft bearing of the second preferred embodiment.

A second preferred embodiment is explained in reference to FIG. 9 and FIG. 10. The main shaft of the second preferred embodiment has different structure and arrangement from that of the first preferred embodiment.

As illustrated in FIG. 9, only the first main shaft bearing 90 is provided to support the main shaft 12 instead of both the first and second main shaft bearings in the first preferred embodiment. One main shaft bearing is provided on the hub side and the structure of the first main shaft bearing is shown in FIG. 10.

A plurality of arrays of self-aligning roller bearings are used as the first main shaft bearing 90.

Further, the first main shaft bearing 90 is surrounded by a first main shaft bearing cover 92 and secured onto the supporting rail 28 by a flange member 94 provided on both sides in the radial direction. The supporting rail 28 is formed along the direction of the main shaft on both sides in the width direction of the first frame part 22a.

The self-aligning roller bearing has a high radial load capability, and is capable of withstanding heavy load and impact load, being subjected to axial load in both direction to a certain extent and self-aligning itself. Thus, one self-aligning roller bearing is arranged as the first main shaft bearing 90 on the hub side and on the side opposite to the hub, the hydraulic pump unit is supported on the nacelle 4 via the pump bearings 54, 54 of the hydraulic pump unit 10.

In such a case that the main shaft 12 is supported by only the first main shaft bearing 90 as shown in the second preferred embodiment, the hydraulic pump unit can be fit onto the main shaft 12 in one step unlike the first preferred embodiment in which the pump unit is fit onto the main shaft 12 in two separate steps. As a result, the assembling process is simplified and can be performed with higher efficiency. As the second main shaft bearing is omitted, the entire structure can be smaller and lighter. Further, it is possible to remove the hydraulic pump unit from the main shaft 12 without removing any bearing from the main shaft 12, nor removing the main shaft 12 from the supporting rail 28.

Third Preferred Embodiment

Figure 11:
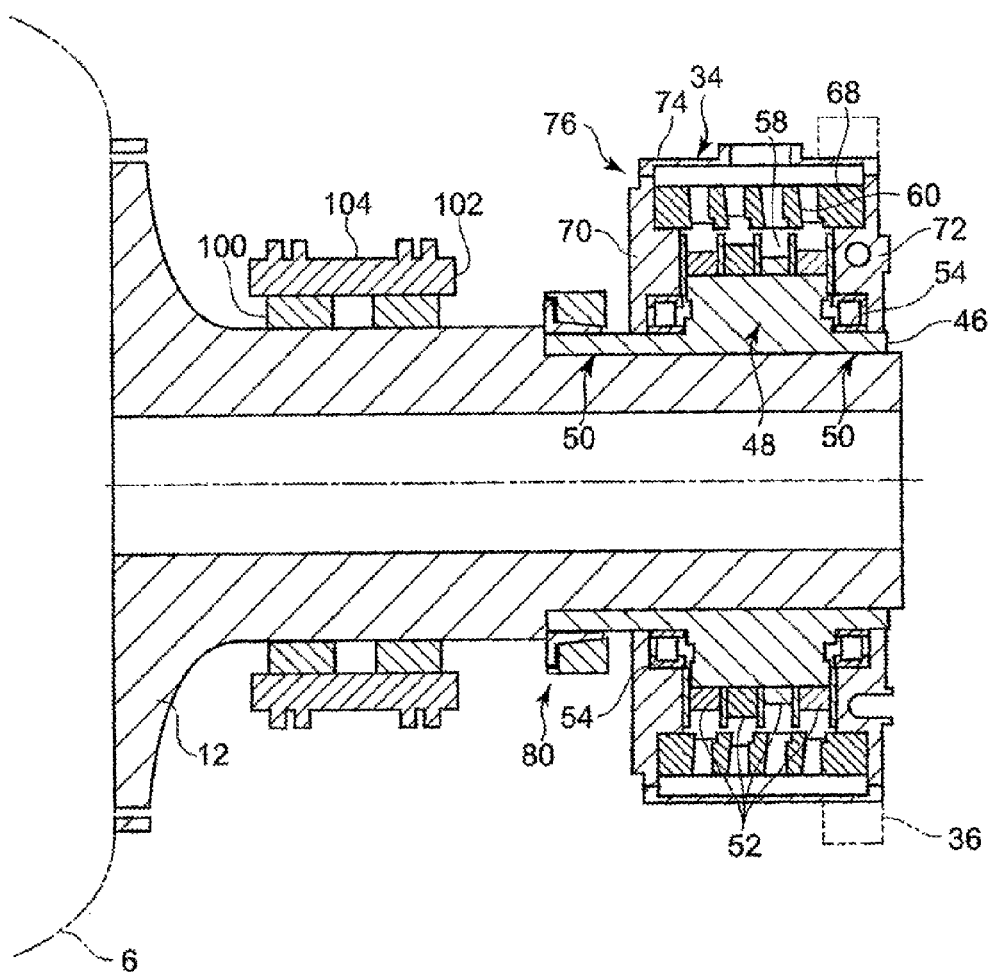
FIG. 11 is an illustrative drawing of a main shaft bearing of a third preferred embodiment.

A third preferred embodiment is explained in reference to FIG. 11. The main shaft of the third preferred embodiment has different structure and arrangement from that of the second preferred embodiment.

FIG. 11 shows a third main shaft bearing 100 and a fourth main shaft bearing 102 arranged between the pump unit 10 and the hub 6. The third main shaft bearing 100 and the fourth main shaft bearing 102 secure the main shaft 12 rotatably on the body side of the wind turbine generator or the tidal current generator. The main shaft 12 is supported and fixed to the nacelle 4 side only by the third main shaft bearing 100 and the fourth main shaft bearing 102.

The assembling is performed by inserting and fixing the third main shaft bearing 100 to the main shaft 12, then inserting and fixing the fourth main shaft bearing 102 to the main shaft 12 adjacent to the third main shaft bearing 100 or with a distance from the third main shaft bearing 100, then fitting the hydraulic pump unit 10 having been assembled beforehand on the main shaft 12 via the cylindrical member of the hydraulic pump unit 10, and then fixing the hydraulic pump unit 10 to the main shaft 12 by means of a fixing member which is a shrink disk connection 80 so as to be unitized.

The third main shaft bearing 100 and the fourth main shaft bearing 102 are surrounded by a bearing cover 104 which is arranged to slide over the third main shaft bearing 100 and the fourth main shaft bearing 102 and secured onto a supporting rail 28 by a flange member 106 (See FIG. 2) provided on both sides in the radial direction. The supporting rail 28 (See FIG. 2) is formed along the main shaft 12 on both sides in the width direction of the first frame part 22a.

According to the third preferred embodiment, prior to fitting the hydraulic pump unit 10 onto the main shaft 12, the third and fourth main shaft bearings 100, 102 are inserted and fixed to the main shaft. Specifically, two main shaft bearings are inserted but the step of inserting and fixing the main shaft bearings is performed before the step of inserting the large hydraulic pump unit 10. Thus, the fixing of the hydraulic pump unit to the main shaft can be securely performed.

Further, the hydraulic pump unit 10 is supported on an axial end of the main shaft 12 and two main shaft bearings are arranged on the hub side. Thus, the distance for inserting the hydraulic pump unit 10 can be shorter and, unlike the case of the structure of the unitized hydraulic pump structure, it is easy to mount the hydraulic pump unit onto the main shaft.

Furthermore, the rest of the structure and operation effect is the same as the first preferred embodiment and the second preferred embodiment.

The disassembly procedure for any of the first, second and third preferred embodiments is the reverse of the assembly procedures just described. Assembly or disassembly procedures may be carried out in a factory, at a wind turbine installation side, or even after erection of the wind turbine.

As described above, the first, second and third preferred embodiments use the exemplary case in which the present invention is applied to a wind turbine generator. But the present invention is also applicable to the tidal current generator. The tidal current generator refers to a generator which is installed in places such as sea, a river and a lake, and utilizes tidal energy for power generation. The tidal current generator has the same structure as the wind turbine generator 1 except that the blade 8 is rotated by the movement of water instead of the wind.

The tidal current generator comprises the main shaft 12 rotated by the tidal current, the hydraulic pump (hydraulic pump unit) 10 mounted on the main shaft 12, the hydraulic motor 14 to which the hydraulic pressure generated by the hydraulic pump 10 is introduced and the generator 18 for generating electric power. The same reference numbers are used here to explain the components that are common to the first preferred embodiment. The hydraulic pump 10 forms a unitized hydraulic pump unit.

Further, the hydraulic pump (hydraulic pump unit) 10 comprises, in the same manner as the hydraulic pump structure of the wind turbine generator 1, a cylindrical member 46 being fit on the outer circumference of the main shaft 12 and the hydraulic pump body 76 arranged on the outer circumferential side of the cylindrical member 46. It is possible to insert and fix the hydraulic pump unit 10 to the main shaft 12 via the cylindrical member 46.

INDUSTRIAL APPLICABILITY

According to the present invention, the hydraulic pump which is mounted on the main shaft of the wind turbine is configured so as to improve the easy of mounting the unit to the main shaft and to achieve a simplified mounting process. As a result, this can be highly applicable to a hydraulic pump of a wind turbine generator.

REFERENCE SIGNS LIST 1 wind turbine generator
2 tower
4 nacelle
6 hub
8 blade
10 hydraulic pump (hydraulic pump unit)
12 main shaft
14 hydraulic motor
16 hydraulic pipe
18 generator
20 first main shaft bearing
21 second main shaft bearing
22 frame
22a first frame portion
22b second frame portion
24 first main shaft bearing cover
26,32,94,106 flange portion
28 supporting rail
30 second main shaft bearing cover
34 pump housing
36 torque arm
38 damper mechanism
40 hub mounting section
42 first stepped section
44 second stepped section
46 cylindrical member 48 large diameter section
50 small diameter section
52 ring cam
54 pump bearing
56 roller
58 piston
60 cylinder
62 pressure chamber
64 low pressure control valve
66 high pressure control valve
68 cylinder supporting member
70 front side wall
72 back side wall
74 outer circumferential wall
76 hydraulic pump part
80 shrink disk connection mechanism
90 first main shaft bearing
92 first main shaft bearing cover
100 third main shaft bearing
102 fourth main shaft bearing
104 shaft bearing cover
106 flange portion
D1 first diameter
D2 second diameter
D3 third diameter

The invention claimed is:

1. A hydraulic pump structure for a wind turbine generator or a tidal current generator which comprises a hub equipped with a plurality of blades, a main shaft connected to the hub and a hydraulic pump mounted on the main shaft, the hydraulic pump structure comprising:
a hydraulic pump unit including
a cylindrical member, which is fit onto an outer circumference of the main shaft, and
a hydraulic pump body, which is arranged on an outer circumferential side of the cylindrical member to be attached to the main shaft via the cylindrical member, the hydraulic pump body being unitized with the cylindrical member to form the hydraulic pump unit,
wherein the hydraulic pump body comprises:
a ring cam is mounted on the outer circumference of the cylindrical member;
a pump bearing mounted on the outer circumference of the cylindrical member;
a pump housing supported by the cylindrical member rotatably with respect to the cylindrical member via the pump bearing;
a plurality of pistons, which is housed in the pump housing and is configured to be actuated by the ring cam that is rotatable with the main shaft; and
a plurality of cylinders, which guides the plurality of pistons in a radial direction and is arranged in a circumferential direction,
wherein the hydraulic pump unit is configured such that the cylindrical member unitized with the hydraulic pump body is insertably fixed to the main shaft,
wherein
the cylindrical member has a large diameter section and small diameter sections disposed on both ends of the large diameter section,
the ring cam is arranged on an outer circumferential side of the large diameter section, and
the pump bearing is mounted on stepped portions between the large diameter section and the small diameter sections.

2. The hydraulic pump structure according to claim 1, wherein the main shaft has a stepped portion with a reduced diameter, and a tip section of the cylindrical member of the hydraulic pump unit comes in contact with the stepped portion of the main shaft so as to position the hydraulic pump unit.

3. The hydraulic pump structure according to claim 1, wherein the cylindrical member is fixed to the main shaft by any one of a shrink disk connection, a flange coupling, a key connection and an involute spline connection.

4. The hydraulic pump structure according to claim 1, wherein the pump housing is formed into an almost cylindrical shape having end walls, and the end walls of the pump housing have an inner circumferential opening which is supported by the pump bearing.

5. The hydraulic pump structure according to claim 1, wherein the main shaft has a hollow structure.

6. A method of mounting the hydraulic pump of the wind turbine generator or the tidal current generator having the hydraulic pump structure according to claim 1, the method comprising:
assembling the hydraulic pump unit in advance; then
inserting and fixing to the main shaft a first main shaft bearing which secures the main shaft rotatably on a body side of the wind turbine generator or the tidal current generator; then
fitting the hydraulic pump unit having been assembled beforehand onto the main shaft via the cylindrical member of the hydraulic pump unit; and then
fixing the hydraulic pump unit to the main shaft by a fixing member.

7. The method according to claim 6, further comprising:
inserting and fixing a second main shaft bearing to the main shaft,
wherein the first main shaft bearing is inserted and fixed to the main shaft, the hydraulic pump unit is then inserted and fixed to the main shaft, and the second main shaft bearing is then inserted and fixed to the main shaft.

8. The method according to claim 6,
wherein the hydraulic pump unit and the first main shaft bearing are inserted and fixed to the main shaft from a side opposite to the hub.

9. The method according to claim 6, further comprising:
fixing the main shaft to a nacelle on the body side of the wind turbine generator or the tidal current generator in a state where the first main shaft bearing and the hydraulic pump unit are fixed to the main shaft, after said inserting and fixing the first main shaft bearing and the hydraulic pump unit to the main shaft.

10. The method according to claim 9,
wherein in said fixing the main shaft to the nacelle on the body side of the wind turbine generator or the tidal current generator, the pump housing of the hydraulic pump unit is fixed to the nacelle on the body side of the wind turbine generator or the tidal current generator via a damper mechanism which has a damping effect against vibration.

11. The method according to claim 10,
wherein the damper mechanism prevents deformation of the pump housing and an assembling difference while maintaining an axial center of the pump housing of the hydraulic pump unit with respect to the nacelle, and the damper mechanism is mounted on a flange portion protruding in a radial direction from both sides of a torque arm arranged on an outer circumference of the pump housing.

12. A method of mounting the hydraulic pump of the wind turbine generator or the tidal current generator having the hydraulic pump structure to claim 1, the method comprising:
assembling the hydraulic pump unit in advance; then inserting and fixing to the main shaft a third main shaft bearing which secures the main shaft rotatably on a body side of the wind turbine generator or the tidal current generator; then
inserting and fixing a fourth main shaft bearing to the main shaft adjacent to the third main shaft bearing or with a distance from the third main shaft bearing; then
fitting the hydraulic pump unit having been assembled beforehand on the main shaft via the cylindrical member of the hydraulic pump unit; and then
fixing the hydraulic pump unit to the main shaft by a fixing member.

13. The method according to claim 12,
wherein the hydraulic pump unit and the third and fourth main shaft bearings are inserted and fixed to the main shaft from a side opposite to the hub.

14. The method according to claim 13, further comprising fixing the main shaft to a nacelle on the body side of the wind turbine generator or the tidal current generator in a state where the third and fourth main shaft bearings and the hydraulic pump unit are fixed to the main shaft, after said inserting and fixing the third and fourth main shaft bearings and the hydraulic pump unit to the main shaft.

15. The method according to claim 14,
wherein in said fixing the main shaft to the nacelle on the body side of the wind turbine generator or the tidal current generator, the pump housing of the hydraulic pump unit is fixed to the nacelle on the body side of the wind turbine generator or the tidal current generator via a damper mechanism.

16. The method according to claim 15,
wherein the damper mechanism, which has a damping effect against vibration and prevents deformation of the pump housing and an assembling difference while maintaining an axial center of the pump housing of the hydraulic pump unit with respect to the nacelle, and is mounted on a flange portion protruding in a radial direction from both sides of a torque arm arranged on an outer circumference of the pump housing.

17. A hydraulic pump structure for a wind turbine generator or a tidal current generator which comprises a hub equipped with a plurality of blades, a main shaft connected to the hub and a hydraulic pump mounted on the main shaft, the hydraulic pump structure comprising:
a hydraulic pump unit including
a cylindrical member attached to the main shaft, and
a hydraulic pump body attached to the main shaft via the cylindrical member,
wherein the hydraulic pump body comprises:
a ring cam mounted on the cylindrical member;
a pair of pump bearings mounted on the cylindrical member;
a pump housing supported by the cylindrical member rotatably with respect to the cylindrical member via the pair of pump bearings;
a plurality of pistons, which is housed in the pump housing and is configured to be actuated by the ring cam that is rotatable with the main shaft; and
a plurality of cylinders, which guides the plurality of pistons in a radial direction and is arranged in a circumferential direction, and
wherein
the cylindrical member has a first section and a pair of second sections disposed on both ends of the first section,
each of the second sections has a different diameter from the first section,
the ring cam is arranged on the first section, and
each of the pump bearings is mounted on a stepped portion between the first section and one of the second sections.

18. The hydraulic pump structure according to claim 17,
wherein the hydraulic pump body is arranged on an outer circumference of the main shaft via the cylindrical member, and
wherein the cylindrical member includes
a large diameter section defining the first section, the ring cam arranged on an outer circumference of the first section, and
a pair of small diameter sections defining the pair of the second sections, each of the small diameter sections having a diameter smaller than the large diameter section.

* * * * *